United States Patent Office 3,738,915
Patented June 12, 1973

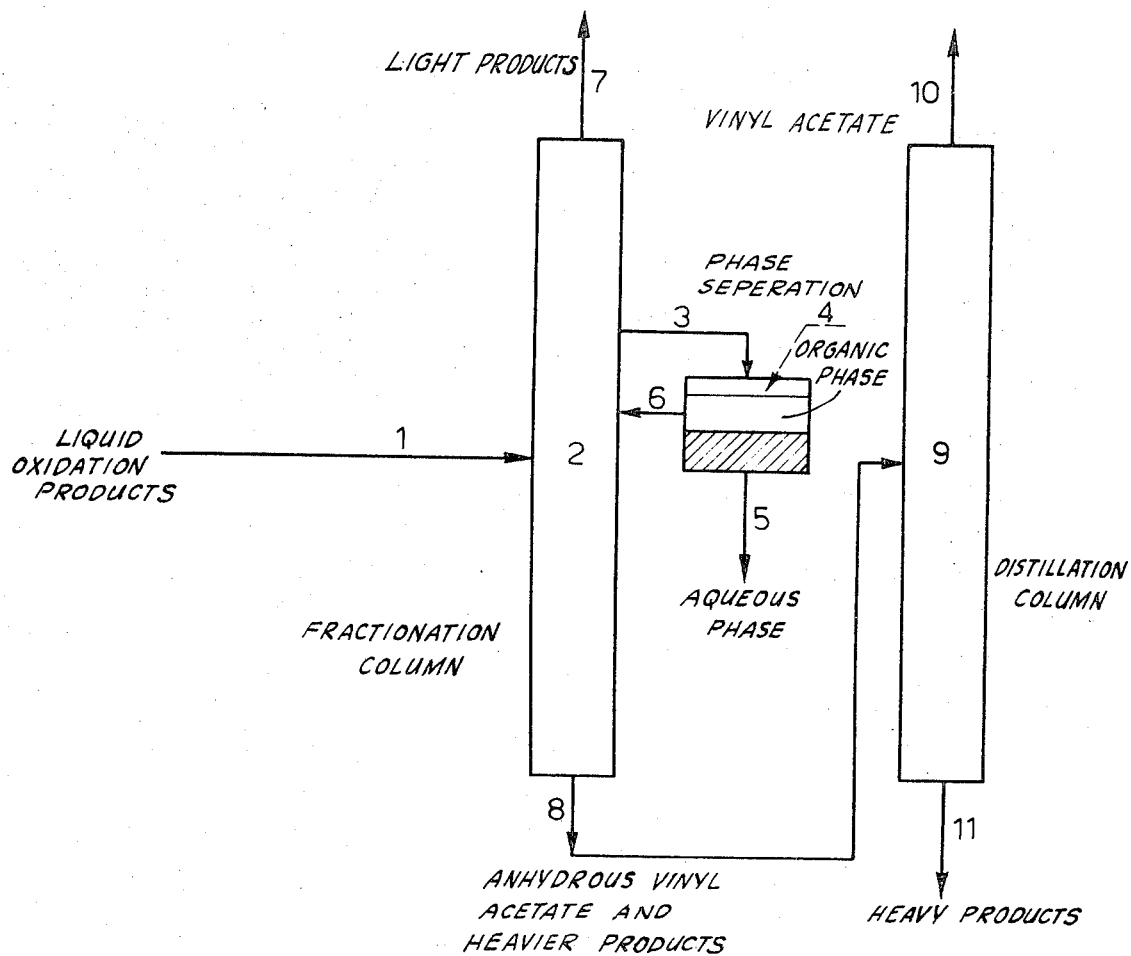

3,738,915
METHOD OF SEPARATING VINYL ACETATE FROM LIQUID MIXTURES WITH PLURAL DISTILLATIONS AND SIDE STREAM PHASE SEPARATION
Lucio di Fiore, Milan, Claudio Divo, Saronno, and Marcello Ghirga, Bresso, Italy, assignors to Societá Italiana Resine S.p.A., Milan, Italy
Filed June 18, 1971, Ser. No. 154,374
Claims priority, application Italy, July 1, 1970, 26,853/70
Int. Cl. C07c 67/06
U.S. Cl. 203—39
11 Claims

ABSTRACT OF THE DISCLOSURE

Vinyl acetate is separated from mixtures also containing methyl acetate and water, by feeding the mixtures to an intermediate position of a fractional distillation column, drawing off an aqueous phase above that position and separating it into an aqueous and a organic phase, returning the organic fraction to the column at a point between the mixture feed point and the point at which the aqueous phase is drawn off, and removing light products at the top of the column and vinyl acetate, with heavy products, at the bottom for subsequent fractionation.

---

The present invention relates to the preparation of vinyl acetate by catalytically oxidising ethylene in the presence of acetic acid; more particularly it relates to the separation of the vinyl acetate from the normally liquid products of the reaction.

According to a known method, vinyl acetate is produced from ethylene and acetic acid by means of an oxidative reaction using palladium salts as a catalyst.

Such processes are normally carried out in the presence of a redox system.

More particularly, ethylene and oxygen, or gases containing molecular oxygen, are fed into a solution or suspension in acetic acid of salts of palladium, copper, or alkali metals or alkali earth metals.

In such processes, high pressures are used, normally from 20 to 70 kg./sq. cm., and temperatures of 50 to 200° C. are employed.

The normally liquid reaction products comprising unchanged acetic acid, water, more or less large quantities of acetaldehyde, together with vinyl acetate, are separated from the gaseous stream emerging from the oxidation reactor.

Also present in the liquid products of reaction are by-products consisting of organic substances which are heavier than vinyl acetate, particularly ethyl acetate, and also lighter products such as methyl acetate, which renders the separation process difficult.

According to one technique, distillation is used to separate the acetic acid and a major part of the water from the liquid reaction mixtures. The acid is recycled to the oxidation reactor after concentration.

The top products of distillation, consisting essentially of vinyl acetate, with minor amounts of methyl acetate, acetaldehyde and water, are subjected to treatment for dehydration and separation of the various compounds from the vinyl acetate.

According to another technique, distillation is used to separate acetic acid as a bottoms product from the liquid reaction mixtures containing vinyl acetate, and then acetaldehyde is separated as a top product from the distillate.

The residue is then cooled resulting in separation of an organic phase and an aqueous phase.

From the latter the vinyl acetate contained therein is separated, while the organic phase, consisting essentially of vinyl acetate, methyl acetate and water, is subjected to treatments for dehydration and separation of the various compounds from the vinyl acetate.

However, the dehydration has various difficulties also due to the presence of products lighter than vinyl acetate which complicate the separation process.

Finally, recovery of vinyl acetate from the mixtures described requires complex fractionation systems which do not always completely reliably function over a period of time.

Similar problems arise in the separation of vinyl acetate from the products of reaction obtained in those processes in which the ethylene is oxidised in the presence of catalysts consisting essentially of metallic palladium, or in those processes carried out in vapour phase in which the ethylene, acetic acid and oxidising gas are suppied to catalysts consisting of rare earth metals or the oxides or salts of such metals. It has now been found possible to eliminate the drawbacks described and obtain vinyl acetate simply and economically from the liquid reaction products derived from the catalytic oxidation of ethylene, in anhydrous form and containing none of the other by-products of reaction.

The method according to the present invention consists essentially of suppying to a distillation column the liquid mixtures comprising vinyl acetate, methyl acetate, water and possibly acetaldehyde; separating the products lighter than vinyl acetate at the top of the said column; recovering the vinyl acetate as bottoms together with the heavier products and separating the water in the form of a lateral stream from the distillation column.

The vinyl acetate which is thus obtained is then subjected to further fractionation designed to separate the heavy by-products.

Thus, according to one embodiment of the method of the present invention, from the normally liquid products derived from the catalytic oxidation of ethylene it is possible to separate acetic acid and the major part of the water as a bottom product, by using distillation.

The distillate, consisting essentially of vinyl acetate, methyl acetate, acetaldehyde and water is subjected to separation according to the method of the present invention. According to another embodiment, from the normally liquid products from the catalytic oxidation of ethylene, it is possible first to separate acetic acid as a bottom product and then acetaldehyde is separated as a top product from the distillate.

The residue from this final distillation is cooled so as to separate it into an aqueous phase and an organic phase.

The organic phase, consisting substantially of vinyl acetate, methyl acetate and water, is then subjected to the distillative processes according to the present invention.

More precisely, the liquid mixtures described are preferably supplied to a distillation column having from 30 to 70 theoretical trays, at a point partway between the top and the bottom. For this purpose, tray columns or filling columns may be used.

The supply of the column is preferably between the fifteenth and the sixty-fifth theoretical tray, in order to change the profiles of concentration of the various compounds as little as possible.

From a point partway between that of supply of the mixture which is subjected to distillation and the top of the column is drawn off a lateral stream which is fed to a separator outside of the column itself wherein an organic phase is separated from an aqueous phase.

The aqueous phase is discharged, and the organic phase is returned to the column at a point lower down than the one from which the lateral stream is drawn, but not lower than the point at which the mixture subjected to fractionation is introduced into the column.

In particular, in order to achieve such a lateral stream, a separator tray is used which, in the preferred embodiment, is placed in the column from 1 to 10 trays above that at which the mixture which is subjected to distillation is supplied.

At the top of the column are separated the products lighter than vinyl acetate, while vinyl acetate is recovered at the bottom together with the products which are heavier than it.

It must be noted that according to another embodiment of the method of the present invention, separation of the aqueous and organic phases is carried out inside the distillation column by means of the separator tray. In this case, only the aqueous phase is extracted from the column while the organic phase is directly refluxed to the tray immediately beneath the separator tray.

According to a method described in our copending U.S. patent application Ser. No. 151,945, filed June 10, 1971, the crude liquid mixtures obtained in the catalytic oxidation of ethylene in the presence of acetic acid, are directly subjected to a treatment of extractive distillation in the presence of acetic acid. By means of such a process, the products heavier than vinyl acetate, particularly ethyl acetate, are separated at the bottom, together with the acetic acid.

At the top are obtained mixtures comprising essentially vinyl acetate, methyl acetate, acetaldehyde and water.

These final mixtures may be subjected to the distillative process according to the present invention. In this case, the products which are separated at the bottom of the column will obviously comprise vinyl acetate only.

For better comprehension of the method according to the present invention, reference is made to the attached figure.

In this drawing, reference numeral 1 is the feed for supplying to the fractionation column 2 the mixture which is subjected to fractionation.

A lateral stream is drawn off which separates at 4 into an aqueous phase (which is discharged through line 5) and an organic phase. The latter is returned to the column 2 through line 6 at a height midway between the feed to the column and the lateral stream 3.

The light products are recovered through 7, while the product discharged through 8 is subjected to distillation in the column 9, the vinyl acetate coming off as overhead stream 10 and the heavy products as bottoms 11.

By proceeding according to the method of the present invention, it is possible firstly to achieve virtually complete recovery of the vinyl acetate contained in the mixtures which are subjected to fractionation.

In addition, the product obtained is anhydrous and free from by-products of the catalytic oxidation of ethylene. Lastly, the method is very simple and economically suitable.

The following experimental example will serve to illustrate the invention further without limiting it in any way.

EXAMPLE 1

A glass distillation column of the "Normschliff" type is used which has 65 perforated trays with a diameter equal to 30 mm..

At the fortieth tray of the column, 1700 g. per hour of a mixture are supplied, the composition of the mixture, expressed at percentages by weight, being as follows:

| | Percent |
|---|---|
| Acetaldehyde | 0.5 |
| Methyl acetate | 1.5 |
| Vinyl acetate | 96.2 |
| Water | 1.6 |
| Heavy matter | 0.2 |

Such a mixture has been obtained from the preparation of vinyl acetate by the catalytic oxidation of ethylene in the presence of acetic acid, after separation of the acetic acid and most of the water from the normally liquid products of reaction.

The column also contains a separator tray situated immediately beneath the tray at which the mixture which is to be subjected to fractionation is introduced.

During fractionation, a reflux ratio of 1:50 is maintained, and the work is performed at a bottom temperature equal to approximately 56°. In addition, a very small quantity of a vinyl acetate polymerisation inhibitor is introduced at the top of the column.

In this test, the separator tray is used for separation of the aqueous phase from the organic phase.

The aqueous phase is thus extracted from the column while the organic phase is caused to flow back directly on to the tray immediately beneath it.

When working in such conditions, it has been possible to obtain a distillate at the top at the rate of 34.8 g. per hour, having the following composition: acetaldehyde 8.5 g., methyl acetate 23.5 g., vinyl acetate 2.3 g. and water 0.5 g.

Also, 29.2 g. per hour of a mixture consisting of 26.7 g. water, 1.5 g. methyl acetate and 1.0 g. vinyl acetate, was extracted at the side of the column.

Recovered at the base of the column is a product with a purity of 99.7% vinyl acetate. This product also contains 0.2% by weight of products heavier than vinyl acetate, 300 p.p.m. methyl acetate and 50 p.p.m. water.

We claim:

1. A method of separating vinyl acetate from liquid mixtures comprising vinyl acetate, water, methyl acetate and possibly acetaldehyde comprising:
    (1) feeding said liquid mixtures to a fractionation column at a first point intermediate the top and bottom of said column wherein said liquid mixtures are subjected to fractional distillation;
    (2) removing a first stream from said fractionation column at a second point intermediate said first point and the top of said column;
    (3) separating said first stream into an aqueous phase and an organic phase;
    (4) discharging said aqueous phase from the system;
    (5) recycling said organic phase to said fractionation column at a third point intermediate said first and second points;
    (6) recovering a second stream at the top of said fractionation column consisting essentially of products lighter than vinyl acetate;
    (7) recovering a third anhydrous stream at the bottom of said fractionation column consisting essentially of vinyl acetate and products heavier than vinyl acetate; and
    (8) separating the vinyl acetate from said third anhydrous stream in a second distillation column.

2. The method of claim 1 wherein the aqueous phase is separated from the organic phase in said fractionation column in a separator tray, wherein the aqueous phase is extracted from the fractionation column and discharged from the system and wherein the organic phase flows directly to the tray underneath said separator tray.

3. The method of claim 1 wherein said first point is between the 15th and 65th tray of said fractionation column which has from 30 to 70 theoretical trays.

4. The method of claim 3 wherein said first stream is drawn off at a separator tray situated from 1 to 10 trays above said first point.

5. The method of claim 1 wherein said liquid mixtures comprise the liquid reaction products obtained from the catalytic oxidation of ethylene and consists essentially of vinyl acetate, water, methyl acetate and acetaldehyde.

6. The method of claim 5 wherein said catalytic oxidation of ethylene comprises feeding ethylene and oxygen or a gas containing molecular oxygen into a solution or suspension in acetic acid of catalytic salts and wherein acetic acid is separated from the liquid reaction products to provide said liquid mixtures.

7. The method of claim 5 wherein said catalytic oxidation comprises contacting, in the vapor phase and in the presence of a catalyst, ethylene, acetic acid and oxygen or a gas containing molecular oxygen and separating acetic acid from the liquid reaction products to provide said liquid mixtures.

8. The method of claim 1 wherein said liquid mixtures are derived from the normally liquid reaction products of the catalytic oxidation of ethylene by subjecting said normally liquid reaction products to a first distillation to separate acetic acid as a bottoms product, followed by a second distillation to remove acetaldehyde as an overhead stream to provide a bottoms stream consisting essentially of vinyl actate, methyl acetate and water thereby providing said liquid mixtures.

9. The method of claim 1 wherein said liquid mixtures are derived by a process which comprises catalytically oxidizing ethylene in the presence of acetic acid forming normally liquid reaction products, subjecting said normally liquid reaction products to distillation forming a bottoms stream comprising acetic acid and products heavier than vinyl acetate and a top stream consisting essentially of vinyl acetate, methyl acetate, acetaldehyde and water, said top stream forming said liquid mixtures which are fed to said fractionation column.

10. The method of claim 9 wherein said third anhydrous stream consists essentially of vinyl acetate only.

11. The method of claim 1 wherein said third anhydrous stream is fed to said second distillation column at a point intermediate the top and bottom of said second distillation column to form a bottoms product consisting essentially of products heavier than vinyl acetate and a top stream consisting essentially of vinyl acetate only, said top stream being anhydrous and containing substantially no by-products which normally result from the catalytic oxidation of ethylene.

References Cited

UNITED STATES PATENTS

| | | | |
|---|---|---|---|
| 3,438,870 | 4/1969 | Roscher et al. | 203—14 |
| 3,507,755 | 4/1970 | Bitners et al. | 203—98 |
| 3,547,783 | 12/1970 | Yamaguchi et al. | 203—98 |
| 3,149,055 | 9/1964 | Houghland | 203—98 |

WILBUR L. BASCOMB, JR., Primary Examiner

U.S. Cl. X.R.

203—14, 81, 98, 99, DIG. 10; 260—497 A, 499